April 2, 1940.   G. STEUERLEIN   2,195,503
GUN MOUNTING IN AIRCRAFT OR THE LIKE
Filed June 22, 1937   2 Sheets-Sheet 2
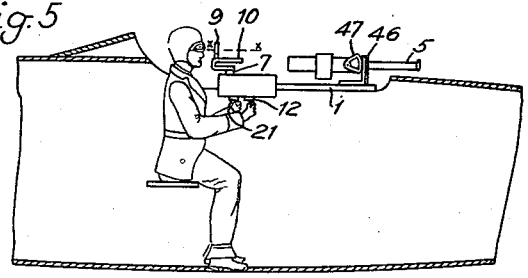
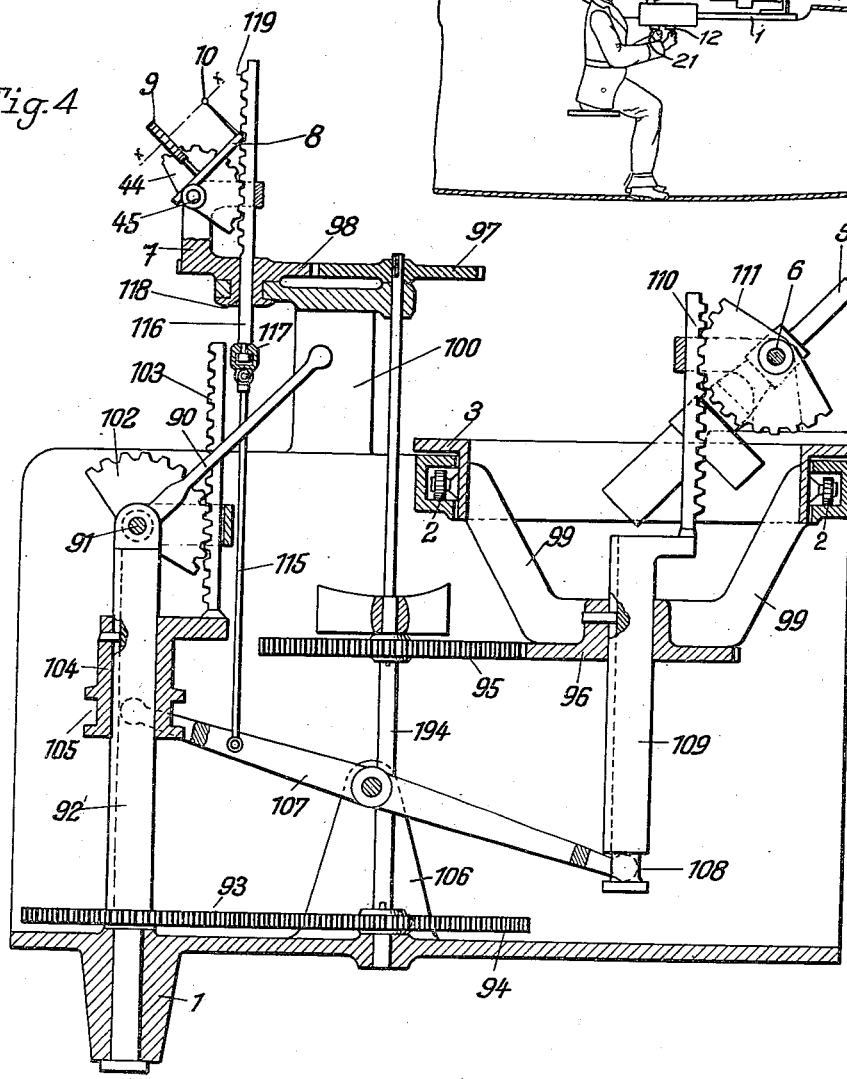
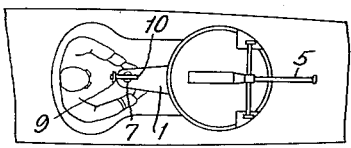
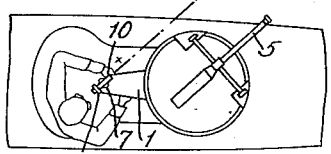
Inventor:

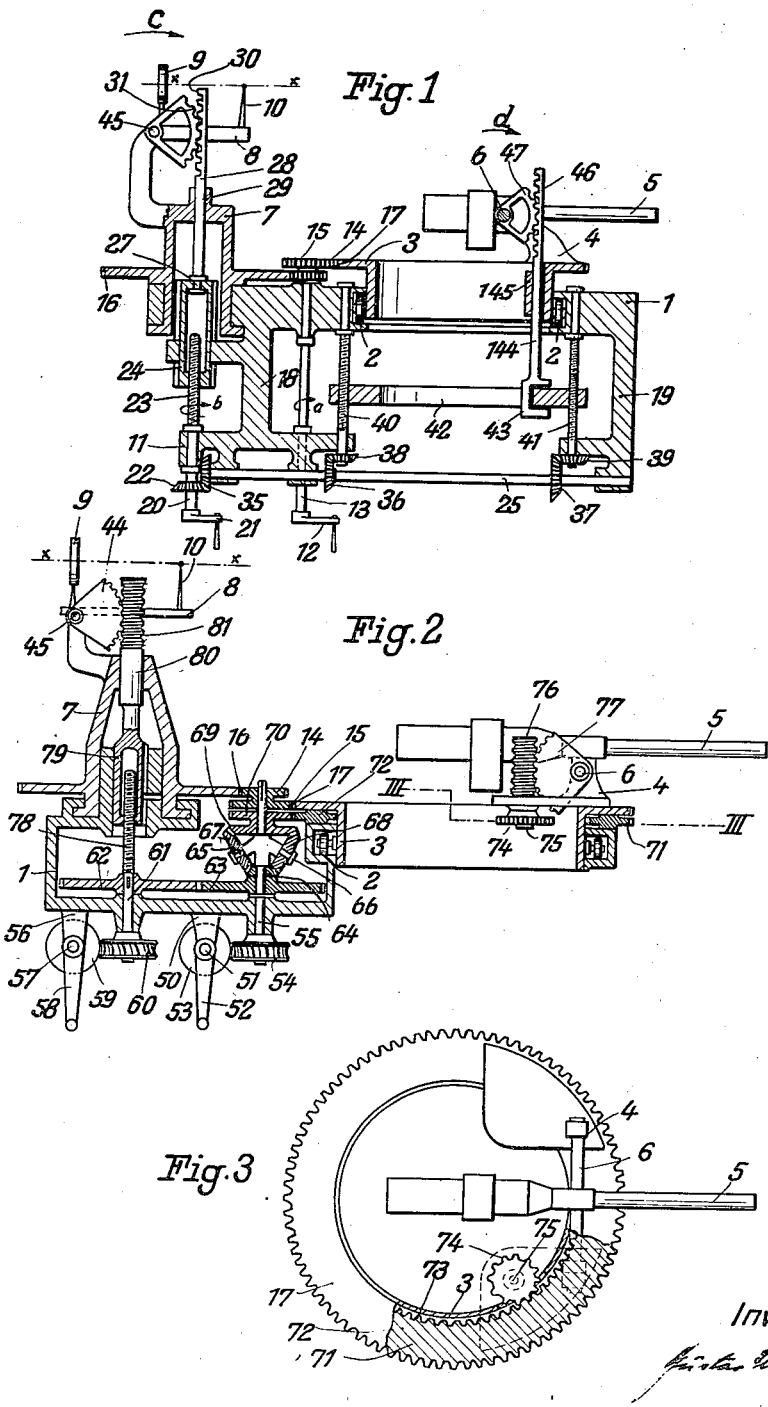

Patented Apr. 2, 1940

2,195,503

UNITED STATES PATENT OFFICE 2,195,503

GUN MOUNTING IN AIRCRAFT OR THE LIKE

Gustav Steuerlein, Dessau, Germany, assignor to Junkers Flugzeug-und-Motorenwerke Aktiengesellschaft, Dessau, Germany Application June 22, 1937, Serial No. 149,559½
In Germany June 18, 1936

4 Claims. (Cl. 89—37.5)

My invention pertains to gun mountings, more especially for use in connection with aircraft or the like and particularly to mountings for automatic machine guns, that are sighted by means of sighting devices spaced from the gun proper.

In a gun mounting of this kind a plurality of automatic machine guns fixed to the body of an aircraft at different points, for instance on the wings and on the front and rear ends of the fuselage, are sighted and fired from a gunner's stand located for instance in the central section of the fuselage. However, this arrangement is unsatisfactory for the following reasons. Due to the forces acting upon the body of the craft, which result from the air current and the inertia action, the body of the craft will become temporarily deformed. These deformations create relative movements of that section of the fuselage where the gunner's stand is located and those sections where the guns are mounted. Consequently, if the sight line of the sighting device is adjusted to a point at a target and the barrel directed accordingly by means of members, adapted to transmit the movements of the sight line onto the barrel, the deformations of the aircraft body will cause the direction in which the gun is pointed to diverge from the sight line. Therefore in such gun mountings, true aiming is possible only, if the body of the craft is not deformed.

It is an object of my invention to avoid these drawbacks and to insure true aiming at all times, even if the body of the aircraft becomes deformed. It is a further object of my invention to provide a simple construction, requiring very little space, so that it can be installed in fuselages or other sections of small aircraft.

In the drawings affixed to this specification and forming part thereof some embodiments of my invention are illustrated diagrammatically by way of example, wherein like numbers denote like parts.

In the drawings:

Fig. 1 is a section on the centre lines of the parts supporting the gun and the sighting device, displaying the means for transmitting the movements of the sight line onto the barrel of the machine gun, Fig. 2 is a similar section of another embodiment, Figure 3 is a partial section on the line III—III of Figure 2.

Figure 4 is a view similar to Figure 1 showing a third modification.

Figures 5 and 6 are diagrammatic views of the foundation or base, the sighting device and the machine gun mounted in the fuselage of an aircraft, Figure 5 being a side elevation and Figure 6 a plan view.

Figure 7 is a plan view similar to Figure 6 but showing the sight and the gun barrel pointed in a different direction.

Referring to the drawings, the first to Figure 1, the machine gun 5 and the sighting device 8, 9 and 10 are carried by the base or foundation 1 which is secured to the body of an aircraft and possesses the rigidity required to resist all deforming stresses.

In Figure 1 a ring 3 supporting the machine gun 5 is rotatably mounted on the base or foundation 1 by means of roller bearings 2. The ring 3 carries brackets 4 forming bearings for a shaft 6 upon which the machine gun 5 is mounted so that it can be turned together with the said shaft about the axis of the latter. A sleeve member 7, carrying the sighting device 8, 9 and 10, is rotatably mounted on the foundation 1 with its vertical axis parallel to the vertical axis of the ring 3. The sighting device consists of a lever 8, pivotally mounted on the member 7 and carrying the sighting means 9 and 10. The pivot axis 45, about which the lever 8 turns, extends horizontally parallel with the axis of the shaft 6. The sight line $x$—$x$ is adjusted by turning the sleeve member 7 and by rocking the lever 8. The resulting horizontal and vertical movements of the sight line $x$—$x$ are transmitted to the barrel of the machine gun 5 so that the sight line and the barrel always point in the same horizontal and vertical directions. A vertical shaft 13 rotatably mounted in bearings on the foundation 1 has a crank 12 thereon, and gears 14 and 15 which mesh with gears 16 and 17 provided on the ring 3 and sleeve member 7 respectively. The meshing gears 14 and 16, and 15 and 17 are of equal ratio so that when the crank 12 is turned the member 7 and ring 3 turn through equal angles. For vertical movement of the lever 8 and gun 5 a shaft 20 is supported in a bearing 11 on the foundation 1 coaxially with the sleeve member 7. This shaft has a crank 21 and a bevel gear 22 at one extremity while its other extremity 23 is threaded. This threaded end engages a shackle 24 which is vertically slidable in guides on the foundation 1 and is held by these guides against rotary movement. A rod 28 terminating at one extremity in a rack 30 is rotatably supported at 27 on the shackle 24, and is guided vertically at 29 in the sleeve member 7 by which it is held against rotation relative to the latter. The rack 30 engages a segmental gear 31 fixed to the lever 8. A bevel gear 35 fixed on a shaft 25 meshes with the bevel gear 22 on the shaft 20. The shaft 25 extends at right angles to the shaft 20 and is mounted in bearings formed integral with portions 18 and 19 of the foundation 1. On the shaft 25 are fixed bevel gears 36 and 37 meshing with bevel gears 38 and 39 fixed on threaded spindle 40 and 41 respectively which are in threaded engagement with threaded apertures formed in a ring 42 arranged beneath and coaxially with the ring 3. A rod 144 has a bifurcated extremity 43 which engages the lower and upper sides of the ring 42, and at its opposite extremity a rack 46 is provided which projects through a vertical guide 145 on the ring 3. The rack 46 engages a segmental gear 47 fixed on the shaft 6.

The device operates as follows: By turning the shaft 13 in the direction of the arrow $a$ the sleeve member 7 carrying the sighting device and the ring 3 carrying the machine gun are rotated through equal angles. By turning the shaft 20 in the direction on the arrow $b$ the shaft 25 and the spindles 40 and 41 are rotated simultaneously to lower the ring 42 and shackle 24. Downward movement of the ring 42 moves the rack 144 downward thereby lowering the elevation of the gun 5 through the segmental gear 47, and downward movement of the shackle 24 lowers the elevation of the sight 8 correspondingly through the rack 28 and its coacting segmental gear 31. Thus adjustment of the sight line $x—x$ and the gun barrel through equal angles in the direction of the arrows $c, d$ is obtained.

In the embodiment shown in Figures 2 and 3 the transmission of the movements of the sight line $x—x$ to the gun barrel is effected in a different manner. A bracket 50 on the base or foundation 1 supports a shaft 51 carrying a crank 52 and a helical gear 53 which meshes with a helical gear 54 fixed on a vertical shaft 55 rotatably supported by the foundation 1. Fixed on the shaft 55 is a gear 14 meshing with the gear 16 on the sleeve member 7a and a gear 15 meshing with the gear 17 on the ring 3. A bracket 56 supports a shaft 57 carrying a crank 58 and a helical gear 59 fixed on the said shaft meshes with a helical gear 60 fixed on a vertical shaft 61. A threaded end 78 of the latter shaft engages a shackle 79 vertically slidable in the foundation 1 but held by the latter against rotation. A circular rack 81 on a rod 80 extending from the shackle 79 meshes with a segmental gear 44 fixed on the shaft 45 on which the lever 8 is also secured.

On the vertical shaft 61 is fixed a gear 62 meshing with a gear 63 loose on the shaft 55 and carrying a bevel gear 64 which meshes with bevel gears 67 and 68 rotatably supported by arms 65 and 66 respectively keyed on the shaft 55. The bevel gears 66 and 67 mesh with another bevel gear 69 which is loosely mounted on the shaft 55. The bevel gear 69 is rigidly connected to a gear 70 which meshes with an external gear 71 formed around the periphery of an annulus 72 arranged coaxially with the ring 3 and mounted for rotation around the latter. The annulus 72 also has an internal gear 73 formed thereon which meshes with a gear 74 keyed on a shaft 75 rotatably mounted on the ring 3. A worm 76 on the shaft 75 engages a segmental gear 77 fixed on the shaft 6 which carries the gun 5 for rotation therewith.

By rotation of the crank 52 the shaft 55 and the gears 14 and 15 fixed thereon are turned through the helical gears 53 and 54. The gears 14 and 15 meshing with the gears 16 and 17 respectively rotate the sleeve member 7a carrying the sighting device, and the ring 3 carrying the machine gun, simultaneously through equal angles. The bevel gears 67 and 68 then roll on the bevel gear 64 which is not rotated and cause the bevel gear 69 to rotate in the same direction as the shaft 55.

When the shaft 55 is rotated the ring 3 and the annulus 72 must turn at the same speed. This is accomplished in the following manner. The external gear 71 and the gear 17 are both the same diameter, and the gears 15 and 70 which mesh with them are also the same diameter. The bevel gears 67 and 68 are carried by the arms 65 and 66 respectively which are fixed on the shaft 55; and the gear 64 is now stationary. Therefore in order that the gears 69 and 70 shall turn at the same speed as the shaft 55 and the gear 17, the gear 64 must be half the diameter of the gear 69. Thus upon rotation of the crank 52 the annulus and ring turn together at the same speed so that rotation of the ring does not alter the elevation of the gun 5.

In order to adjust the sight line $x—x$ and the barrel of the gun 5 in a vertical direction the crank 58 is turned and the shaft 61 and the gear 62 are rotated thereby. Similar to the arrangement shown in Figure 1, rotation of the threaded end of the shaft 61 raises or lowers the shackle 79 together with the circular rack 81, thereby turning the segmental gear 44 and adjusting the sight line in a vertical direction. Rotation of the gear 62 is transmitted to the bevel gear 64 through a gear 63 and to the bevel gear 69 by the bevel gears 67 and 68 the axes of which (since the shaft 55 is now not rotated) are in fixed position. Rotation of the bevel gear 69 is transmitted to the annulus 72 through the gear 70 which is integral with the bevel gear 69, and the annulus is rotated relative to the ring 3 which is then stationary. The internal gear 73 of the annulus turns the gear 74 and the worm 76, and the latter rotates the segmental gear 77 and the shaft 6 to which the barrel of the gun is secured. The gear ratio is so determined that the sight line $x—x$ and the gun barrel move together through equal angles.

In the embodiments shown in Figures 1 to 3 the sight line and the gun barrel are adjusted by two separate means, the cranks 12 and 21 or the cranks 52 and 58. If it is desired to adjust them by means of a single control the arrangement shown in Figure 4, for example, may be resorted to. There a hand lever 90 serving as the control member is pivoted on a vertical shaft 92 rotatably mounted on the base or foundation 1. The pivot axis of the lever 90 extends horizontally at right angles to the axis of the shaft 92, thus the lever 90 is mounted for universal movement and is adapted to be pointed in any desired direction. Fixed on the shaft 92 is a gear 93 which meshes with a gear 94 fixed on a vertical shaft 194 rotatably mounted in the foundation 1 and having gears 95 and 97 thereon. The gear 95 meshes with a gear 96 dependingly mounted beneath the ring 3 by means of arms 99. The gear 97 on the shaft 194 meshes with a gear 98 integral with a member 101 carrying the sighting device 8, 9, 10, and rotatably mounted on an extension of the foundation 1. The ratios of the gears 93, 94, 95, 96, 97 and 98 are such that the member 101 and the ring 3 are rotated simultaneously through equal angles by moving the lever 90 in a horizontal direction.

On a pin 91 on which the hand lever 90 is secured is fixed a segmental gear 102 which meshes with a rack 103 extending from a sleeve 104 mounted for reciprocation on the shaft 92 and held against rotation relative to the latter. A bracket 106 on the foundation 1 carries a double armed lever 107 one arm of which engages an annular groove 105 formed around the sleeve 104 while the other arm engages a similar annular groove 108 formed around the rod 109. The rod is mounted for axial movement through the gear 96 but is held against rotation independently of the latter. This rod 109 carries a rack 110 which engages a segmental gear 111 fixed on the shaft 6 by which the machine gun 5 is carried.

A rod 115 pivoted on the lever 107 carries a rack 119 which is freely mounted at 117 on the said rod. The rack reciprocates through a guide 118 in the member 101 but is held against independent rotation by its teeth some of which are always in engagement with a segmental gear 44 fixed together with the lever 8 on the shaft 45.

By moving the lever 90 radially the sleeve 104 is moved vertically and its movement is transmitted to the lever 8 and the gun barrel 5 through the lever 107. The length of the arms of the latter and the radii of the segmental gears 44 and 111 are so proportioned that the lever 90, the sight lever 8 and the gun barrel 5 move simultaneously through equal angles.

The operation of this embodiment offers the advantage that in order to adjust the sight line $x$—$x$ and the gun barrel the lever 90 is merely pointed at the target whereby the sight line and gun barrel are adjusted in the same direction.

Figs. 5 and 6 illustrate the way in which the invention is applied to the fuselage of an aircraft, the gunner's stand being located near the operating members (cranks 12 and 21) and near the machine gun 5. If, as shown, the gun is within reach of the gunner, failures, such as gun jamming may be readily repaired by the gunner from his stand. As shown in Figs. 5 and 6 the foundation 1 carrying the gun 5 and the sighting device 8, 9, 10 may be mounted in comparatively small fuselages that are just wide enough to accommodate the gunner.

Fig. 7 shows how the sight line $x$—$x$ and the gun barrel are adjusted without the gunner being compelled to move about.

I wish it to be understood that I do not desire to be limited to the exact details of construction shown and described for obvious modifications will occur to a person skilled in the art.

I claim:

1. In mechanism of the class described a substantially rigid base adapted to resist forces tending to deform it and to be fixedly mounted on an aircraft, a gun mount supported by said base for independent rotation about a vertical axis, a gun positioned on said mount for rotation about a horizontal axis, a sight mount supported by said base for independent rotation about a vertical axis, a sight positioned on said mount for rotation about a horizontal axis, means for rotating said gun and sight mounts simultaneously through the same angle about their respective vertical axes, means for rotating said gun and sight simultaneously through the same angle about their respective horizontal axes, and a single actuating means coupled with each of said last mentioned means for operating them selectively or together.

2. In mechanism of the class described a substantially rigid base adapted to resist forces tending to deform it and to be fixedly mounted on an aircraft, a gun mount supported by said base for independent rotation about a vertical axis, a gun positioned on said mount for rotation about a horizontal axis, a sight mount supported by said base for independent rotation about a vertical axis, a sight positioned on said sight mount for rotation about a horizontal axis, means for rotating said gun and sight mounts simultaneously through the same angle about their respective vertical axes, means for rotating said gun and sight simultaneously through the same angle about their respective horizontal axes, and a single actuating means coupled with each of said last named means for operating them selectively or together, said actuating means including a longitudinally extending member so coupled with the respective rotating means as to occupy at all times a position with reference to the horizontal and vertical identical with that of the gun and sight.

3. In an airplane having a cockpit provided with a gunner's seat, a gun mount comprising a substantially rigid base adapted to resist forces tending to deform it fixedly positioned in operative relation to said cockpit and gunner's seat, a gun mounted thereon for independent rotation about vertical and horizontal axes, a sight mounted thereon in spaced relation to said gun, adjacent the normal head position of the gunner and in his normal line of vision, for independent rotation about vertical and horizontal axes, and independently operable means including an actuating member extending below said base to a point inside the cockpit within easy reach of the gunner's seat coupled with said gun and sight for rotating them simultaneously through the same angle about their vertical or horizontal axes whereby said gun and sight may be manipulated from the gunner's seat with minimum exposure of the operator.

4. In an arrangement of the character described the combination of a rigid base, an annular ring mounted thereon for rotation about a vertical axis, a member including a sight spaced from said ring and mounted for rotary movement on the base about a vertical axis, a gun pivoted on the ring about a horizontal axis eccentric with reference to the ring, a shaft rotatably supported on the base, a gear on the ring and a gear on said member, gears on said shaft meshing with each of the aforesaid gears to turn the ring and member together through equal angles, a second shaft rotatably supported on the base, a segmental gear fixed to the sight, a rack engaging said segmental gear, means moving said rack and segmental gear by rotation of said shaft, coacting gear means mounted upon both said shafts and around said ring, a second segmental gear fixed on said gun, and means cooperating with said gear means and said second segmental gear whereby upon rotation of said second shaft said gun and sight are correspondingly adjusted for elevation.

GUSTAV STEUERLEIN.